Patented Sept. 4, 1951

2,566,887

UNITED STATES PATENT OFFICE 2,566,887

CORROSION INHIBITOR

George C. Hook, Chicago, Ill., assignor to Continental Can Company, Inc., New York, N. Y., a corporation of New York No Drawing. Application October 7, 1949,
Serial No. 120,221

14 Claims. (Cl. 106—14)

The following description relates to my invention of an improved corrosion inhibitor containing a zinc chromate.

Zinc chromates are of recognized value as inhibitors of corrosion on black or deoxidized steel sheets, tin plate and the like. Further, such chromates are admirably suited for pre-coats or primer coats in painting, lacquering and the like. However, these chromates are pigments of the water insoluble type. If finely ground and spread on a metal surface, the chromates adhere rather poorly and do not penetrate the surface depressions. In fact, they are easily rubbed off. Moreover, if dispersed in water or a suitable coating medium for application as a spray, the chromates are apt to clog the nozzle of the spray.

Tin plate which is seamed and then soldered with a solder of a high melting point, for example, one containing 2% tin and 98% lead, frequently corrodes. This is due primarily to the fact that the operations incidental to soldering the seam are apt to scratch or otherwise injure the surface and expose points for corrosive attack.

I have found that water-insoluble chromates can be taken up into solution and thus effectively deposited on a metal surface by roller coating, brush or spray without clogging the spray equipment. In particular, I can use the zinc chromate-potassium chromate complex, commonly known as "Zinc yellow" and the zinc tetroxy chromate. This and similar chromates can be rendered peculiarly satisfactory for depositing an adherent alkaline film of the zinc yellow complex with tetraethanol ammonium hydroxide.

It is a purpose of my invention to provide a corrosion inhibiting composition having superior adherence to the irregularities in the metal surface.

A further object of my invention is to convert an ordinarily insoluble inhibitor into a solution by which it may be spread into practically a molecular coating on the metal.

A still further object of my invention is to provide an inhibiting composition which may be applied as a spray without likelihood of clogging the spray equipment.

Other objects attained by my invention will be evident from the following examples of the preferred way of carrying out my invention as disclosed in the following examples.

Incidental to the prime purpose of the invention, the novel composition may include not only the solvent for the pigment, but likewise a diluent compatible therewith and which is also volatile. In this way, extremely fine grain deposits of practically molecular thickness may be developed on the surface to be protected.

Not only may the diluent be present, but the inhibiting composition may include an ingredient which has film-forming properties. Thus, the operation of protecting against corrosion may be combined with a pre-coat or priming coat for lacquers, paints and the like.

Example 1

I have found that a basic organic material can be used as a solvent for the pigment. For example, tetraethanol ammonium hydroxide in solution in methanol with a concentration of 40% of the hydroxide may thus be used. The following is a typical example:

1 part zinc yellow.
9 parts tetraethanol ammonium hydroxide 40% solution in methanol.
1 part strong aqua ammonia.

This yielded a solution containing 10 to 12% of zinc yellow by weight. The solution is stable as regards reduction or oxidation. To prevent the possible precipitation of chromate on long standing, the solution is stabilized by the addition of a moderate quantity of strong aqua ammonia.

The above composition forms a satisfactory means for depositing the corrosion inhibitor on metal surfaces.

The solution prepared as above may be applied to the metal surface to be protected in any suitable manner as by roller coating, brush, fountain or spray. In the latter case, ordinary atomizers can be used. The solution is projected as a spray, but there is no material tendency toward premature deposition in the spraying equipment which would result in clogging the apparatus.

This solubilized zinc chromate offers a means of applying a corrosion inhibitor in intimate contact with the metal surface to be protected and to a very effective degree. The zinc chromate as formed by the decomposition of the zinc-ammonic chromate has a smaller particle size than the usual size of 0.5 to 1.5 microns common to this type of pigment commercially supplied. Having a smaller particle size, the reconstituted chromate gives a substantial coating over the minute surface imperfections thus being an efficient inhibitor of corrosion without appreciably reducing the surface area available for the adhesion of subsequently applied film-forming materials.

Example 2

When the solution produced in Example 1 is mixed with six times its weight of ethylene glycol monomethyl ether ("Methyl Cellosolve") and filtered, it may be further diluted with the methyl Cellosolve up to a ratio of one part to 100 without production of turbidity.

The above material can be used as a corrosion inhibiting spray for pre-coating or priming a metal surface. It may then be followed by a film forming finishing coat.

Example 3

Suitable film forming compositions may be incorporated with the inhibiting composition. The following are two examples with different coating compositions.

1 part of the zinc yellow complex in 9 parts of tetraethanol ammonium hydroxide as prepared in Example 1.

1 part of strong aqua ammonia.

20 parts of methyl Cellosolve.

1 part of ethyl cellulose of 7 centipoise viscosity (Ethocel).

This material is relatively high in viscosity but still can be sprayed to give a one-coat protection of chromate and film-forming material differing, however, from ordinary pigmenting finishes in that the zinc chromate is in solution in the organic base and dispersed in the film of film-forming material. The particle subdivision is correspondingly smaller and the solution of the chromate inhibitor and the extent of alkalinity approaches that most desirable theoretically.

Example 4

The composition set out in Example 3 is subject to further variation in the type of the film-forming ingredient. Thus four-thirds parts of R. S. (resin solvent) nitrocellulose of 15–25 centipoise viscosity may be substituted for the Ethocel. This gives a good coating when sprayed on a hot side seam. As might be expected, the nitrocellulose is broken down by contact with the organic base.

Example 5

A variation of Example 1 contemplates the solution of zinc tetroxy chromate in tetraethanol ammonium hydroxide and the use of a small proportion of strong ammonia as a stabilizer. The following is a suitable formula:

1 part by weight of zinc tetroxy chromate.

11 parts of 40% solution of tetraethanol ammonium hydroxide in methanol.

2 parts of strong aqua ammonia.

The solution may be diluted with from one to one hundred parts of methyl Cellosolve. The properties and uses are as indicated for Example 1.

The above representative examples indicate the latitude of the invention. Suitable substitutions of equivalent materials and variation in proportion are evident.

All proportions are given in parts by weight. Zinc chromate or preferably zinc chromate-potassium chromate complex, the latter commonly referred to as "zinc yellow," when dissolved in strong ammonia forms a zinc chromate-ammonium hydroxide complex known as zinc-ammonia chromate. I prepare this complex by dissolving 400 grams of zinc yellow pigment (zinc chromate-potassium chromate) in 528 grams of strong aqua ammonia. This latter is the aqua ammonia fortior U. S. P. containing approximately 28% by weight of dissolved ammonia. The pigment is taken into solution by stirring or agitation in the cold. The solution is then diluted with 400 grams of water. The above quantities are not stoichiometrically precise. In fact, ammonia is in excess to obtain better stability. The resulting solution contains approximately 30% by weight of the solubilized pigment. It may be diluted further to a lower concentration of pigment by the addition of more strong aqua ammonia.

The invention enables one to apply a normally insoluble inhibiting agent to a metal surface in a very effective manner. The agent is reconstituted on the surface in substantially molecular particle size. The deposit is of a close penetrating nature and resists abrasion or rinsing. It forms a coating which prevents corrosion but at the same time offers good contact for a coating composition. The zinc chromate-tetraethyl ammonium hydroxide provides a combination of inhibitor and alkaline environment which is least likely to permit corrosion. The invention is to be limited only by the scope of the following claims.

What I claim is:

1. A coating composition for inhibiting corrosion of metals consisting essentially of a normally water-insoluble zinc chromate dissolved in a concentrated methanol solution of tetraethanol ammonium hydroxide.

2. A coating composition for inhibiting corrosion of metals consisting essentially of zinc yellow dissolved in a concentrated methanol solution of tetraethanol ammonium hydroxide.

3. A coating composition for inhibiting corrosion of metals consisting essentially of zinc tetroxy chromate dissolved in a concentrated methanol solution of tetraethanol ammonium hydroxide.

4. A coating composition for inhibiting corrosion of metals consisting essentially of a normally water-insoluble zinc chromate dissolved in a concentrated methanol solution of tetraethanol ammonium hydroxide and strong aqua ammonia.

5. A coating composition for inhibiting corrosion of metals consisting essentially of zinc yellow dissolved in a concentrated methanol solution of tetraethanol ammonium hydroxide and strong aqua ammonia and diluted with ethylene glycol monomethyl ether.

6. A coating composition for inhibiting corrosion of metals consisting essentially of zinc yellow dissolved in a concentrated methanol solution of tetraethanol ammonium hydroxide, strong ammonia, and a soluble cellulose compound of the class consisting of ethyl-cellulose and nitro-cellulose.

7. A coating composition for inhibiting corrosion of metals consisting essentially of zinc yellow dissolved in a concentrated methanol solution of tetraethanol ammonium hydroxide, strong ammonia and ethyl cellulose.

8. A coating composition for inhibiting corrosion of metals consisting essentially of zinc yellow dissolved in a concentrated methanol solution of tetraethanol ammonium hydroxide, strong ammonia and nitro-cellulose.

9. A coating composition for inhibiting corrosion of metals consisting essentially of one part of zinc yellow in approximately nine parts of a methanol solution of tetraethanol ammonium hydroxide (40%) and one part of concentrated aqua ammonia.

10. A coating composition for inhibiting corrosion of metals consisting essentially of one part of zinc yellow in approximately nine parts of a methanol solution of tetraethanol ammonium hydroxide (40%) and one part of concentrated aqua ammonia, the said mixture being diluted with ethylene glycol monomethyl ether.

11. A coating composition for inhibiting corrosion of metals consisting essentially of one part of zinc yellow in approximately nine parts of a methanol solution of tetraethanol ammonium hydroxide (40%) and one part of strong aqua ammonia, to which has been added twenty parts of ethylene glycol monomethyl ether and one part of ethyl cellulose.

12. A coating composition for inhibiting corrosion of metals consisting essentially of one part of zinc yellow in approximately nine parts of a methanol solution of tetraethanol ammonium hydroxide (40%) and one part of strong aqua ammonia, to which has been added twenty parts of ethylene glycol monomethyl ether and approximately one part of nitrocellulose.

13. A coating composition for inhibiting corrosion of metals consisting essentially of one part of zinc tetroxy chromate in approximately eleven parts of a methanol solution of tetraethanol ammonium hydroxide (40%) and two parts of strong aqua ammonia.

14. A coating composition for inhibiting corrosion of metals consisting essentially of one part of zinc tetroxy chromate in approximately eleven parts of a methanol solution of tetraethanol ammonium hydroxide (40%); two parts of strong aqua ammonia and the whole diluted with from one to one hundred parts of ethylene glycol monomethyl ether.

GEORGE C. HOOK.

REFERENCES CITED

The following references are of record in the file of this patent:

UNITED STATES PATENTS

| Number | Name | Date |
| --- | --- | --- |
| 2,069,660 | Sanders | Feb. 2, 1937 |
| 2,078,256 | Lieber et al. | Apr. 27, 1937 |
| 2,330,051 | Heidt | Sept. 21, 1943 |
| 2,379,246 | Muskat | June 26, 1945 |
| 2,416,295 | Ehle | Feb. 25, 1947 |
| 2,419,017 | Grimm | Apr. 15, 1947 |